US012594938B2

(12) United States Patent

Ghaderi et al.

(10) Patent No.: US 12,594,938 B2
(45) Date of Patent: Apr. 7, 2026

(54) OPTIMIZED ELECTRIC MACHINE STOP POSITION FOR LOSS REDUCTION AND VEHICLE LAUNCH

(71) Applicant: Dana Heavy Vehicle Systems Group, LLC, Maumee, OH (US)

(72) Inventors: Ahmad Ghaderi, Rochester Hills, MI (US); William F. Waltz, Toledo, OH (US); Jeremy M. Frenznick, Brighton, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 237 days.

(21) Appl. No.: 18/338,967

(22) Filed: Jun. 21, 2023

(65) Prior Publication Data

US 2024/0425048 A1      Dec. 26, 2024

(51) Int. Cl.
| | |
|---|---|
| *G07C 5/00* | (2006.01) |
| *B60W 10/02* | (2006.01) |
| *B60W 10/08* | (2006.01) |
| *B60W 30/18* | (2012.01) |
| *B60W 40/076* | (2012.01) |
| *G07C 5/02* | (2006.01) |
| *G07C 5/04* | (2006.01) |
| *G07C 5/08* | (2006.01) |

(52) U.S. Cl.
CPC ...... *B60W 30/18018* (2013.01); *B60W 10/02* (2013.01); *B60W 10/08* (2013.01); *B60W 40/076* (2013.01); *B60W 2520/04* (2013.01); *B60W 2552/15* (2020.02); *B60W 2710/022* (2013.01); *B60W 2710/083* (2013.01); *B60W 2710/18* (2013.01)

(58) Field of Classification Search
CPC ........... B60W 30/18018; B60W 10/02; B60W 10/08; B60W 40/076; B60W 2520/04; B60W 2552/15; B60W 2710/022; B60W 2710/083; B60W 2710/18
See application file for complete search history.

(56) References Cited

U.S. PATENT DOCUMENTS

| | | | | |
|---|---|---|---|---|
| 6,452,416 | B1 * | 9/2002 | Kaneda .............. | G01R 31/1263 |
| | | | | 219/69.18 |
| 6,717,281 | B1 * | 4/2004 | Brandon ............... | B60W 20/00 |
| | | | | 290/40 C |
| 6,850,863 | B2 | 2/2005 | Benchaib et al. | |
| 7,592,770 | B2 | 9/2009 | Ho | |
| 10,879,822 | B2 | 12/2020 | Nannen et al. | |
| 12,115,864 | B2 * | 10/2024 | Karl ...................... | B60L 3/0061 |
| 2002/0175653 | A1 | 11/2002 | Elliot et al. | |
| 2006/0022623 | A1 * | 2/2006 | Inaba ...................... | H02P 6/185 |
| | | | | 318/400.02 |

(Continued)

*Primary Examiner* — Kito R Robinson
*Assistant Examiner* — Anthony Gabriel Mora
(74) *Attorney, Agent, or Firm* — McCoy Russell LLP

(57) ABSTRACT

Methods and systems for controlling torque of an electric machine that propels a vehicle when the vehicle is stopped are described. The methods and systems may be applied to synchronous and induction electric machines that are configured to propel a vehicle. The methods and systems may allow a consistent amount of torque to be delivered by an electric machine when vehicle speed and electric machine speed is zero.

19 Claims, 7 Drawing Sheets

(56) References Cited

U.S. PATENT DOCUMENTS

| | | | |
|---|---|---|---|
| 2009/0091284 A1* | 4/2009 | Isobe | F16H 61/32 |
| | | | 318/634 |
| 2009/0269043 A1* | 10/2009 | Namuduri | B62D 5/046 |
| | | | 388/819 |
| 2012/0169358 A1* | 7/2012 | Ono | G01R 31/389 |
| | | | 324/720 |
| 2012/0173066 A1* | 7/2012 | Yamada | H02P 27/085 |
| | | | 903/902 |
| 2013/0296136 A1* | 11/2013 | Doering | F02D 41/065 |
| | | | 477/174 |
| 2015/0001914 A1* | 1/2015 | Antao | B60W 10/196 |
| | | | 303/3 |
| 2018/0120841 A1* | 5/2018 | Endo | B60W 50/082 |
| 2019/0135103 A1* | 5/2019 | Kuze | B60K 6/543 |
| 2020/0088269 A1* | 3/2020 | Okada | B60L 15/2054 |
| 2022/0247335 A1* | 8/2022 | Schwarzkopf | H02P 21/24 |
| 2023/0376023 A1* | 11/2023 | Takano | G05B 23/024 |

* cited by examiner

OPTIMIZED ELECTRIC MACHINE STOP POSITION FOR LOSS REDUCTION AND VEHICLE LAUNCH

TECHNICAL FIELD

The present disclosure relates to a method and system for positioning an electric machine that propels a vehicle in anticipation of vehicle launch.

BACKGROUND AND SUMMARY

An electric vehicle may stop from time to time. After the electric vehicle is stopped, the vehicle may launch from zero speed in response to release of a vehicle brake and/or an increase in driver demand torque. An amount of torque it takes to move the vehicle in an intended forward or reverse direction may be a function of the vehicle's mass and a grade of a road or surface that the vehicle is stopped upon. If the electric vehicle's propulsion source (e.g., an electric machine) outputs less torque than an amount of torque to overcome the vehicle's mass and grade of the surface the vehicle is on, then the vehicle may not move or move in an unintended direction when the vehicle's brakes are released. One way to ensure that there is startability output torque to move the electric vehicle in the intended direction is to oversize the electric vehicle's inverter that supplies electric power to the vehicle's propulsion source so that the vehicle propulsion source may be supplied with a greater amount of electric current. Another potential solution for the mentioned problem is to oversize the electric motor of vehicle propulsion so that the electric vehicle propulsion can produce more torque. However, oversizing the inverter and motor may increase system financial cost and increase system losses. Therefore, it may be desirable to provide a way to increase startability torque without having to oversize the vehicle's inverter or motor.

The inventors herein have recognized the above-mentioned issues and have developed a method for operating a vehicle, comprising: rotating an electric machine to a predetermined position in response to the vehicle being stopped on a first surface having a first grade greater than a threshold grade.

By rotating an electric machine in response to a grade of a surface on which a vehicle is stopped, it may be possible to provide the technical result of generating a uniform torque capacity for an electric machine that is configured to propel a vehicle. In particular, an angular position of a rotor of an electric machine may be adjusted from a position where the electric machine is capable of generating less torque at zero speed to generating more torque at zero speed. For example, if a rotor of an electric machine is at a first angular position, the electric machine may have a torque output capacity (e.g., a capacity to generate an amount of torque) to generate 52,000 Newtons of tractive effort at zero vehicle speed. However, if the rotor angular position is adjusted 30 (or 15 or 7.5) angular degrees, the electric machine may have a torque output capacity of 60,000 Newtons at zero vehicle speed. Thus, the rotational angle of the electric machine's rotor may be adjusted when the electric machine's output torque capacity is less than the maximum output torque capacity of the electric machine at zero speed.

The present description may provide several advantages. In particular, the approach may generate high torque output at zero rotational speeds for an electric machine. In addition, the approach may provide for more consistent electric machine torque output at zero rotational speed of the electric machine. Further, the approach may be applied to differently configured (e.g., 3 phase and 6 phase) synchronous and induction electric machines.

It is to be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
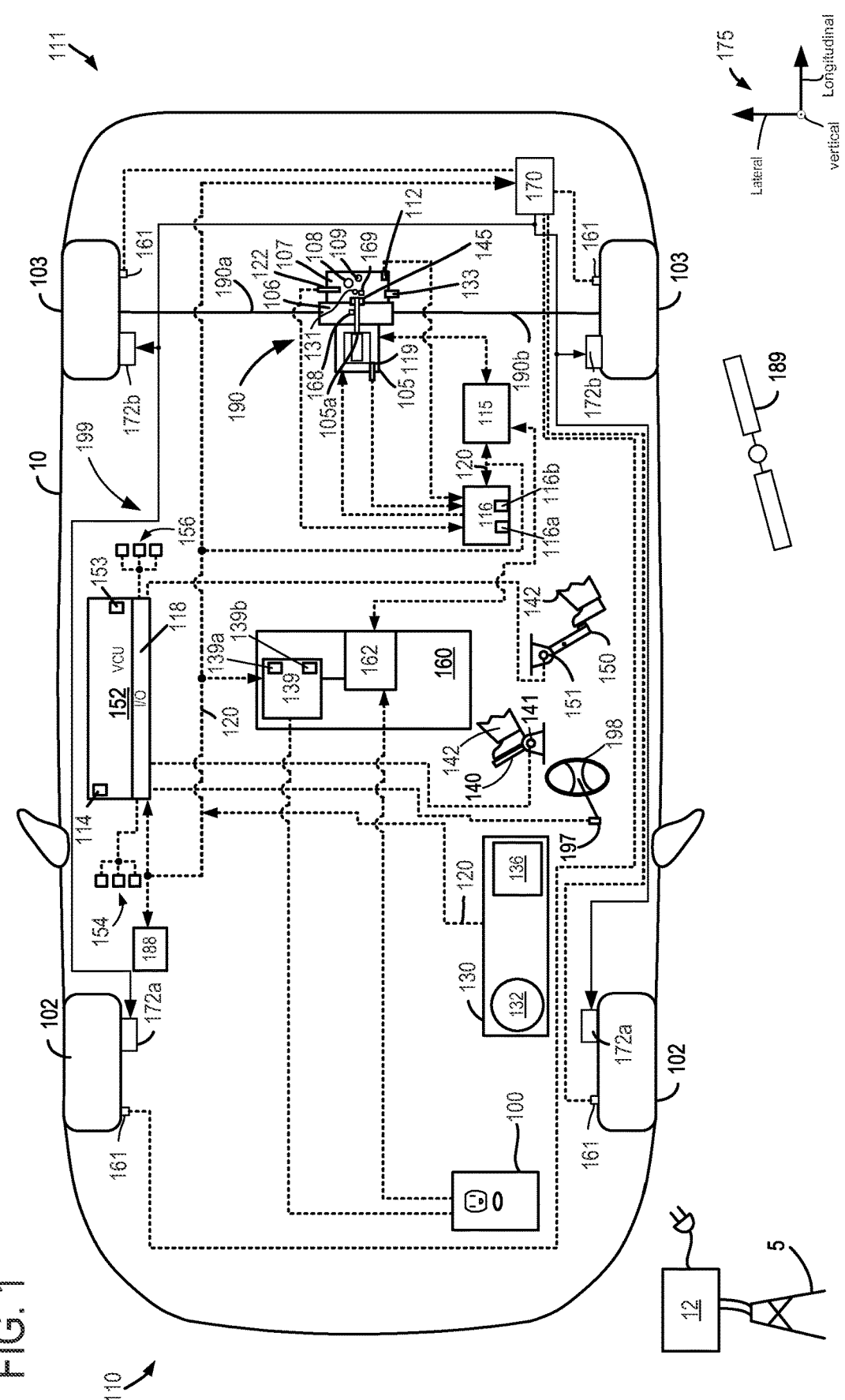
FIG. 1 is an illustration of an example vehicle that includes an electric machine that is configured to propel a vehicle.
Figure 2:
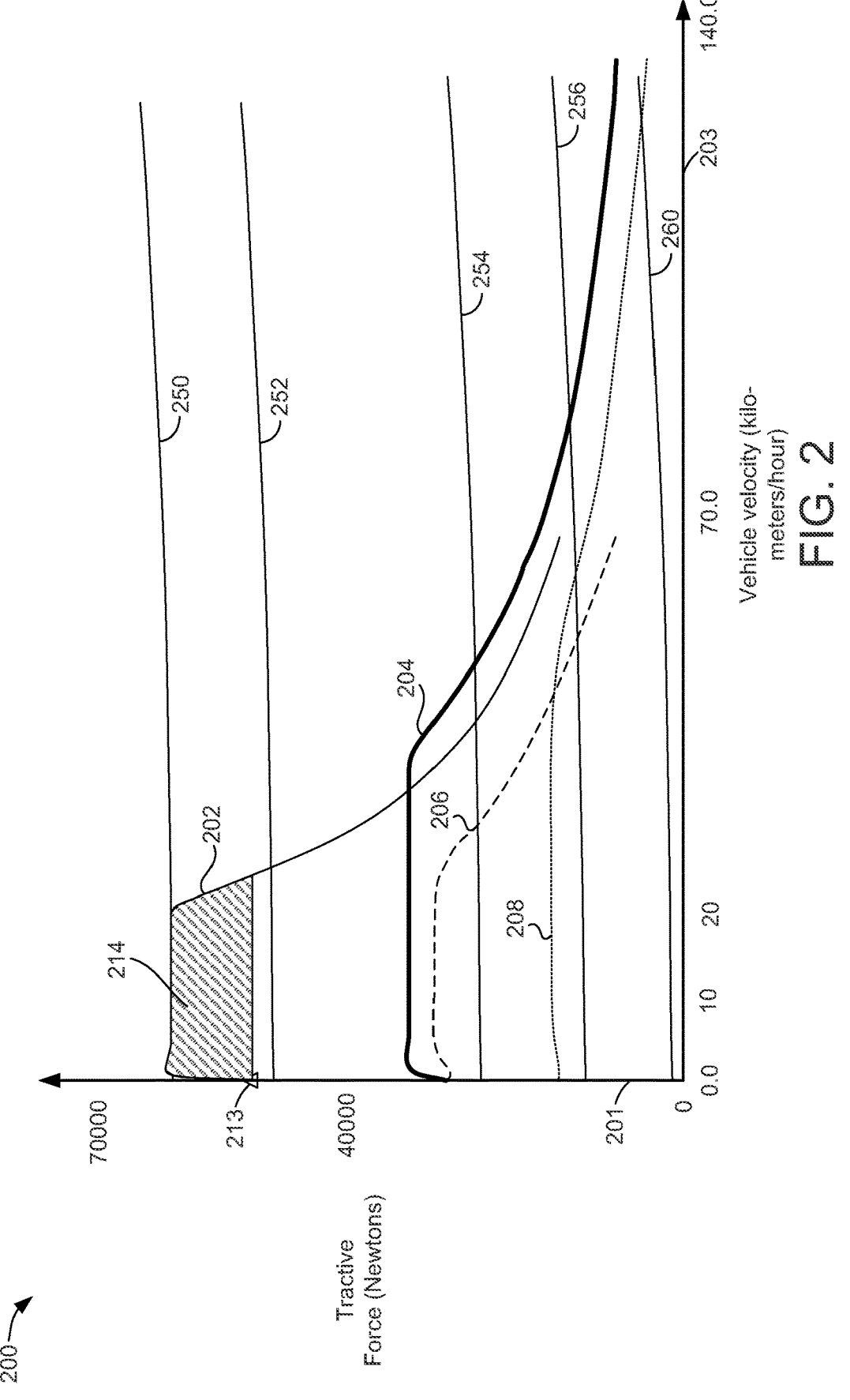
FIG. 2 shows a plot of hypothetical tractive force that may be generated via an electric machine.
Figure 3:
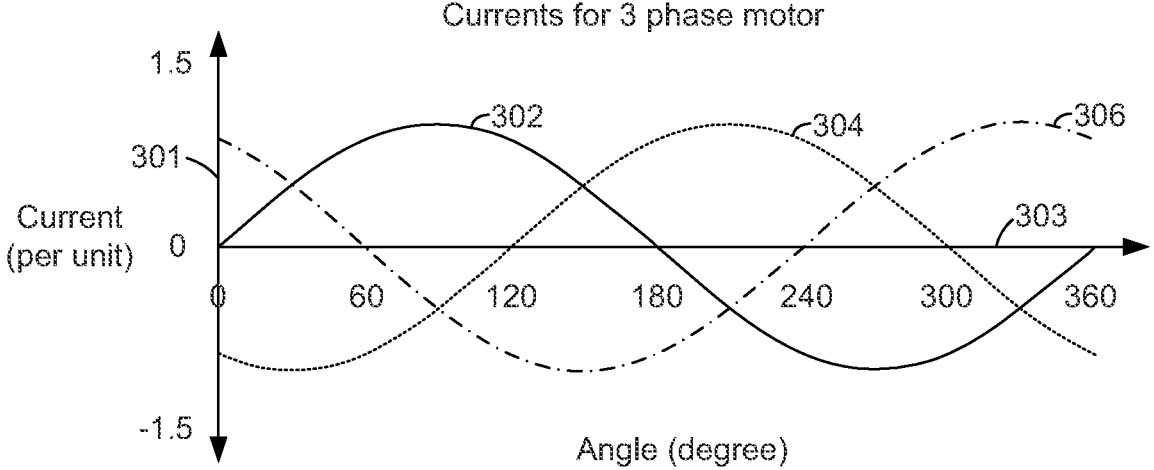
FIGS. 3-8 show example operating characteristics for a three phase electric machine.
Figure 9:
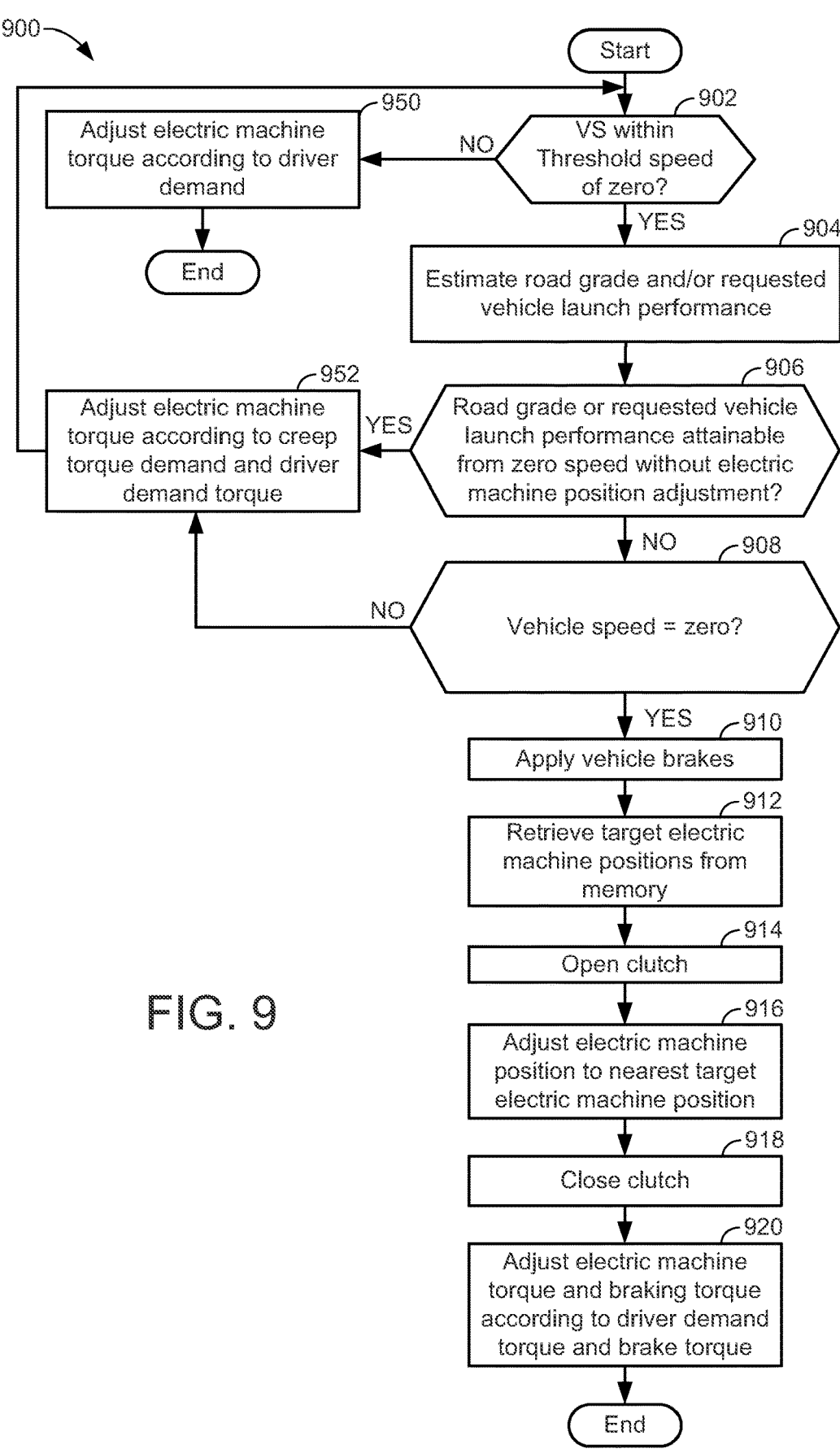
FIG. 9 shows an example method for operating an electric machine of a vehicle.
Figure 11:
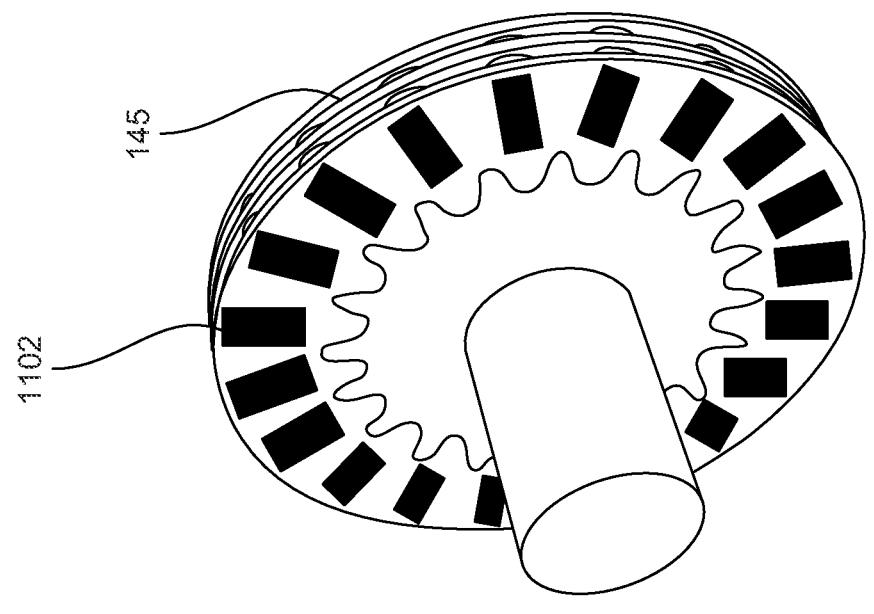
FIGS. 10 and 11 show example driveline clutches.
Figure 10:
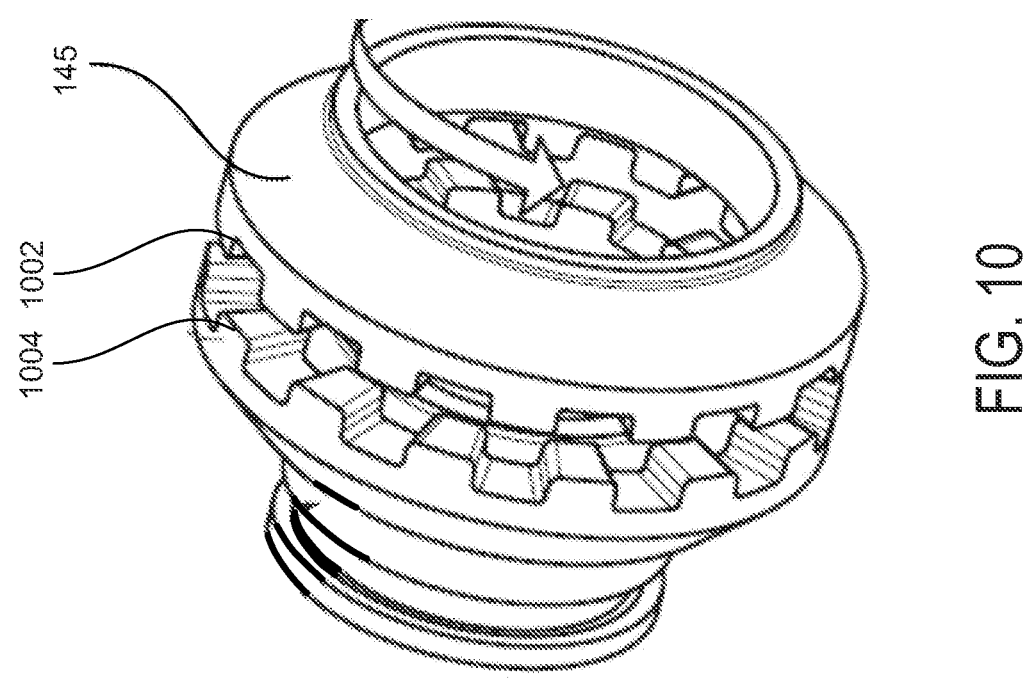

A method and system for operating an electric propulsion source of a vehicle are described. The method and system are suitable for electric and hybrid vehicles. In one example, the method and system rotate a rotor of an electric machine during select vehicle operating conditions so that a consistent tractive effort capacity and a consistent electric machine output torque capacity may be provided. FIG. 1 shows a schematic view of an example vehicle. FIG. 2 shows a plot that shows how tractive force of a vehicle may be related to vehicle speed. FIGS. 3-8 show operating characteristics of an example synchronous electric machine. FIG. 9 shows a flowchart of an example method for operating a vehicle and electric machine. FIGS. 10 and 11 show example driveline clutches.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes a propulsion source 105 (e.g., an electric machine, such as a motor), but in other examples two or more propulsion sources may be provided. In one example, propulsion source 105 may be a synchronous or induction electric machine that may operate as a motor or generator. The propulsion source 105 is fastened to the electrified axle 190 and it delivers power from its rotor 105a to gear set 107. In FIG. 1 mechanical connections between the various components are illustrated as solid lines, whereas electrical connections between various components are illustrated as dashed lines.

Vehicle propulsion system 199 includes an electrified axle 190 (e.g., an axle that includes an integrated electric machine that provides propulsive effort for the vehicle). Electrified axle 190 may include two axle shafts, including a first or right axle shaft 190a and a second or left axle shaft 190b. Vehicle 10 further includes front wheels 102 and rear wheels 103.

The electrified axle 190 may be an integrated axle that includes differential gears 106, gear set 107, and propulsion source 105. Gear set 107 may be referred to as a step ratio transmission and it may include a plurality of gears and one or more clutches to shift between gears. In one example, the gear set may include a first gear 108, a second gear 109, and a third gear 131. Further, the electrified axle 190 may include one or more clutch actuators 112 to shift one or more clutches 145. Clutches 145 may be configured as dog clutches, wet, friction, curvic, or other known configuration. Encoder 168 provides an indication of motor position and a position of a half of clutch 145 (e.g., upstream power path side of clutch 145) and encoder 169 provides an indication of a clutch position of a downstream clutch power path side of clutch 145. FIGS. 10 and 11 show two example clutch configurations. Electrified axle 190 may include a first speed sensor 119 for sensing a speed of propulsion source 105 on an input side of clutch 145 and a second speed sensor 122 for sensing a speed of an output side of clutch 145. Electric power inverter 115 is electrically coupled to propulsion source 105. An axle control unit 116 is electrically coupled to sensors and actuators of electrified axle 190.

Propulsion source 105 may transfer mechanical power to or receive mechanical power from gear set 107. As such, gear set 107 may be a multi-speed gear set that may shift between gears (e.g., first gear 108 and second gear 109) when commanded via axle control unit 116. Axle control unit 116 includes a processor 116a and memory 116b. Memory 116b may include read only memory, random access memory, and keep alive memory. Axle control unit 116 may receive transmission temperature via sensor 133. Gear set 107 may transfer mechanical power to or receive mechanical power from differential gears 106. Differential gears 106 may transfer mechanical power to or receive mechanical power from rear wheels 103 via right axle shaft 190a and left axle shaft 190b. Propulsion source 105 may consume alternating current (AC) electrical power provided via electric power inverter 115. Alternatively, propulsion source 105 may provide AC electrical power to electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from propulsion source 105. Electric power inverter 115 may convert the AC electrical power from propulsion source 105 into DC power to store in battery 160.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139a and memory 139b (e.g., random-access memory, read-only memory, and keep-alive memory).

Vehicle 10 may include a vehicle control unit (VCU) 152 that may communicate with electric power inverter 115, axle control unit 116, friction or foundation brake controller 170, global positioning system (GPS) 188, BMS controller 139, and dashboard 130 and components included therein via controller area network (CAN) 120. VCU 152 includes memory 114, which may include read-only memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not constrained to inverters, transmission controllers, display devices, human/machine interfaces, friction braking systems, and battery controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 130 that an operator of the vehicle may interact with. Dashboard 130 may include a display system 132 configured to display information to the vehicle operator. Display system 132 may comprise, as a non-restricting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 136 may include interfaces that utilize a physical apparatus, such as a key, that may be inserted into the operator interface 136 to activate the electrified axle 190 and propulsion source 105 and to turn on the vehicle 10 or may be removed to shut down the electrified axle and propulsion source 105 to turn off vehicle 10. Electrified axle 190 and propulsion source 105 may be activated via supplying electric power to propulsion source 105 and/or electric power inverter 115. Electrified axle 190 and electric machine may be deactivated by ceasing to supply electric power to electrified axle 190 and propulsion source 105 and/or electric power inverter 115. Still other examples may additionally or optionally use a start/stop button that is manually pressed by the operator to start or shut down the electrified axle 190 and propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the electrified axle 190 including an inverter and electric machine. Spatial orientation of vehicle 10 is indicated via axes 175.

Vehicle 10 is also shown with a foundation or friction brake controller 170. Friction brake controller 170 may selectively apply and release friction brakes (e.g., 172*a* and 172*b*) via allowing hydraulic fluid to flow to the friction brakes. The friction brakes may be applied and released so as to avoid locking of the friction brakes to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand wheel torque, or alternatively a driver demand wheel power, via applying driver demand pedal 140 or via supplying a driver demand wheel torque/power request to vehicle control unit 152. Vehicle control unit 152 may then demand a torque or power from propulsion source 105 via commanding axle control unit 116. Axle control unit 116 may command electric power inverter 115 to deliver the driver demand wheel torque/power via electrified axle 190 and propulsion source 105. Electric power inverter 115 may convert DC electrical power from battery 160 into AC power and supply the AC power to propulsion source 105. Propulsion source 105 rotates and transfers torque/power to gear set 107. Gear set 107 may supply torque from propulsion source 105 to differential gears 106, and differential gears 106 transfer torque from propulsion source 105 to rear wheels 103 via axle shafts 190*a* and 190*b*.

During conditions when the driver demand pedal is fully released, vehicle control unit 152 may request a small negative or regenerative braking power to gradually slow vehicle 10 when a speed of vehicle 10 is greater than a threshold speed. The amount of regenerative braking power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle control unit 152 may request that a first portion of the driver demanded braking power be generated via electrified axle

190 and propulsion source 105 via commanding axle control unit 116. Additionally, vehicle control unit 152 may request that a portion of the driver demanded braking power be provided via friction brakes 172 via commanding friction brake controller 170 to provide a second portion of the driver requested braking power.

After vehicle control unit 152 determines the braking power request, vehicle control unit 152 may command axle control unit 116 to deliver the portion of the driver demand braking power allocated to electrified axle 190. Electric power inverter 115 may convert AC electrical power generated by propulsion source 105 into DC power for storage in battery 160. Propulsion source 105 may convert the vehicle's kinetic energy into AC power.

Axle control unit 116 includes predetermined transmission gear shift schedules whereby fixed ratio gears of gear set 107 may be selectively engaged and disengaged. Shift schedules stored in axle control unit 116 may select gear shift points or conditions as a function of driver demand wheel torque and vehicle speed.

Thus, the system of FIG. 1 provides for a vehicle system, comprising: an electric machine configured to propel a vehicle; a driveline clutch; an inverter electrically coupled to the electric machine; and a controller including executable instructions stored in non-transitory memory that cause the controller to adjust a rotational position of a rotor of the electric machine in response to a surface grade where the vehicle is stopped or a launch metric of the vehicle when the vehicle is stopped. In a first example, the vehicle system further comprises additional executable instructions that cause the controller to adjust the rotational position of the rotor in further response to a rotational position of the electric machine where power losses of the electric machine are minimized at zero speed of the electric machine. In a second example that may include the first example, the vehicle system further comprises additional executable instructions that cause the controller to adjust the rotational position of the rotor in further response to a rotational position of the electric machine where torque output of the electric machine is maximized at zero speed of the electric machine. In a third example that may include one or both of the first and second examples, the vehicle system further comprises additional executable instructions that cause the controller to apply vehicle brakes in response to the vehicle being stopped. In a fourth example that may include one or more of the first through third examples, the vehicle system further comprises additional executable instructions that cause the controller to open a clutch in response to the vehicle being stopped and the surface grade being greater than a threshold amount or a launch metric being greater than a threshold amount prior to adjusting the rotational position of the rotor where the vehicle is stopped. In a fifth example that may include one or more of the first through fourth examples, the vehicle system includes wherein the clutch is a dog clutch. In a sixth example that may include one or more of the first though fourth examples, the vehicle system includes wherein the clutch is a friction clutch.

Turning now to FIG. 2, a hypothetical motor plot illustrating the vehicle performance with a two speed gear set is shown. Plot 200 includes a vertical axis 201 that represents tractive force developed by a vehicle. In this plot, the tractive force generated by the vehicle and the electric machine when vehicle speed is zero represents a non-optimized tractive force for the vehicle at zero vehicle speed. The tractive force for the vehicle increases in the direction of the vertical axis arrow. Plot 200 also includes a horizontal axis 203 that represents vehicle speed. Vehicle speed increases from the left side of FIG. 2 to the right side of FIG. 2. FIG. 2 also shows lines 250-260 that represent lines of tractive force to meet vehicle performance metrics for constant grade surfaces that the vehicle travels upon as a function of vehicle speed. Line 250 represents the amount of tractive force needed to meet vehicle performance metrics when a vehicle is on a traveling surface having a 35% grade. Line 252 represents the amount of tractive force needed to meet vehicle performance metrics when a vehicle is on a traveling surface having a 30% grade. Line 254 represents the amount of tractive effort needed to meet vehicle performance metrics when a vehicle is on a traveling surface having a 15% grade. Line 256 represents the amount of tractive effort needed to meet vehicle performance metrics when a vehicle is on a traveling surface having a 5% grade. Line 260 represents the amount of tractive effort available to meet vehicle performance metrics when a vehicle is on a traveling surface having 0% grade.

Line 202 represents a maximum first gear peak power tractive force capacity for the vehicle (e.g., a maximum amount of tractive force that may be generated by the vehicle) that may be generated for a predetermined amount of time (e.g., 10 seconds) while the vehicle's transmission is engaged in first gear. Line 204 represents a maximum second gear peak power tractive force capacity for the vehicle that may be generated for a predetermined amount of time while the vehicle's transmission is engaged in second gear. Line 206 represents a maximum first gear continuous power tractive force capacity for the vehicle (e.g., a maximum amount of tractive force that may be generated continuously by the vehicle) that may be generated continuously while the vehicle's transmission is engaged in first gear. Line 208 represents a maximum second gear continuous power tractive force capacity for the vehicle that may be generated continuously while the vehicle's transmission is engaged in second gear.

It may be observed that the maximum first gear peak power tractive force capacity for the vehicle when vehicle speed is zero is up to 15% lower than when vehicle speed is between 2 and 20 kilometers/hour (e.g., the force indicated at triangle 213). Similarly, the maximum second gear peak power tractive force capacity for the vehicle when vehicle speed is zero is up to 15% lower than when vehicle speed is between 2 and 20 kilometers/hour. At approximately 2 kilometers/hour vehicle speed, the vehicle may have sufficient tractive force to negotiate a 35% grade according to the vehicle's performance metrics when the vehicle is in first gear. However, at zero vehicle speed, the vehicle has insufficient tractive force to negotiate the 35% grade according to the vehicle's performance metrics when the vehicle is in first gear. Yet, the vehicle has tractive force 213 that is sufficient to negotiate the 30% grade 252 according to the vehicle's performance metrics when the vehicle is in first gear. The system and method described herein seeks to eliminate the motor torque deficiency and make it available to the vehicle at zero speed. The highlighted area 214 represents tractive force that is needed by increasing the output of the electric machine and its associated inverter to meet the vehicle performance metrics in order for the vehicle to negotiate the 30% grade in systems that do not include the tractive force optimization method described herein. Conversely, the system and method described herein may allow the electric machine and vehicle to provide tractive force to negotiate the 35% grade at zero vehicle speed and higher vehicle speeds.

Referring now to FIGS. 3-8, operating characteristics for a three phase synchronous electric machine are shown. FIG.

3 is a plot of three phase electric currents versus electric current angle. The vertical axis 301 represents electric current for the electric machine on a per unit or normalized basis. The horizontal axis 303 represents electric current angle and the electric current angles are indicated below the horizontal axis.

Trace 302 represents electric current for a first phase of electric current for the electric machine. Trace 304 represents electric current for a second phase of electric current for the electric machine. Trace 306 represents electric current for a third phase of electric current for the electric machine. The phase currents are separated by 120 degrees.

Figure 4:
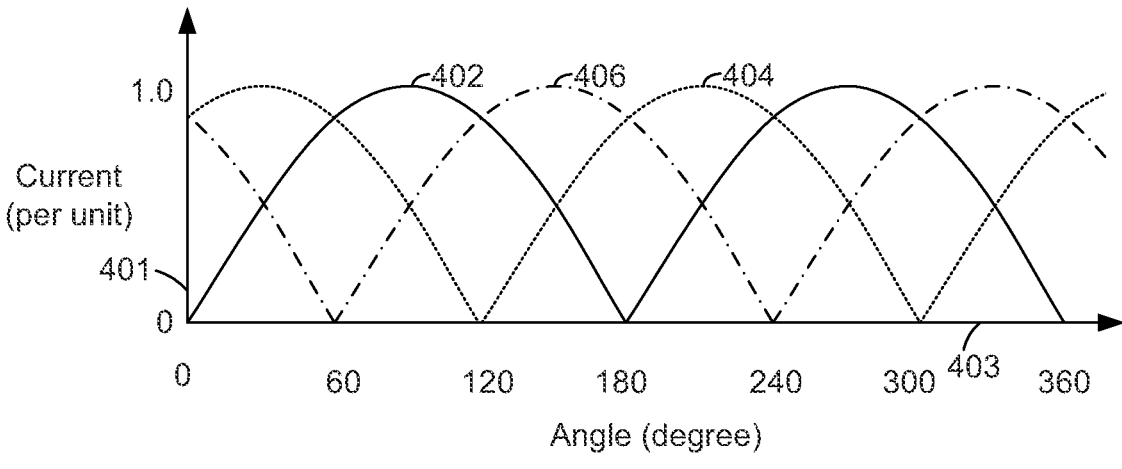

Referring now to FIG. 4, absolute values for each of the three phase currents of the electric machine are shown. The vertical axis 401 represents electric current for the electric machine on a per unit or normalized basis. The horizontal axis 403 represents electric current angle and the electric current angles are indicated below the horizontal axis.

Trace 402 represents the absolute value of the first phase current for the electric machine. Trace 404 represents the absolute value of the second phase current for the electric machine. Trace 406 represents the absolute value of the third phase current for the electric machine.

Figure 5:
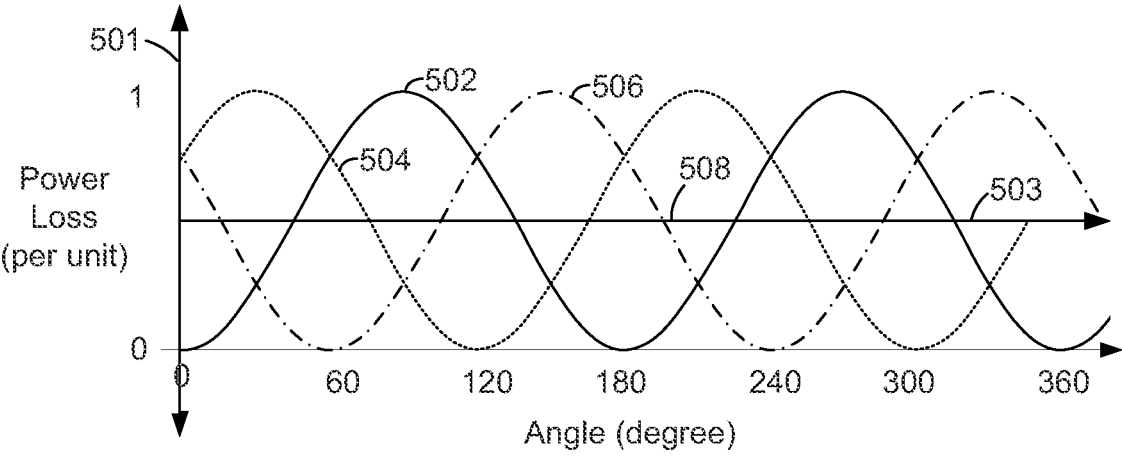

Referring now to FIG. 5, conductive power losses for all phases as a function of current angle for a three phase electric machine operating at a constant torque output amount is shown. The vertical axis 501 represents power losses on a per unit or normalized basis and the amount of power losses increases in the direction of the vertical axis arrow. The horizontal axis 503 represents electric current angle and the electric machine current angles are indicated below the horizontal axis.

Trace 502 represents the conductive power losses for the electric machine for phase a current (e.g., a first phase current). Trace 504 represents the conductive power losses for the electric machine for phase b current (e.g., the second phase current). Trace 506 represents the conductive power losses for the electric machine for phase c current (e.g., the third phase current). Trace 508 represents the average power loss.

Figure 6:
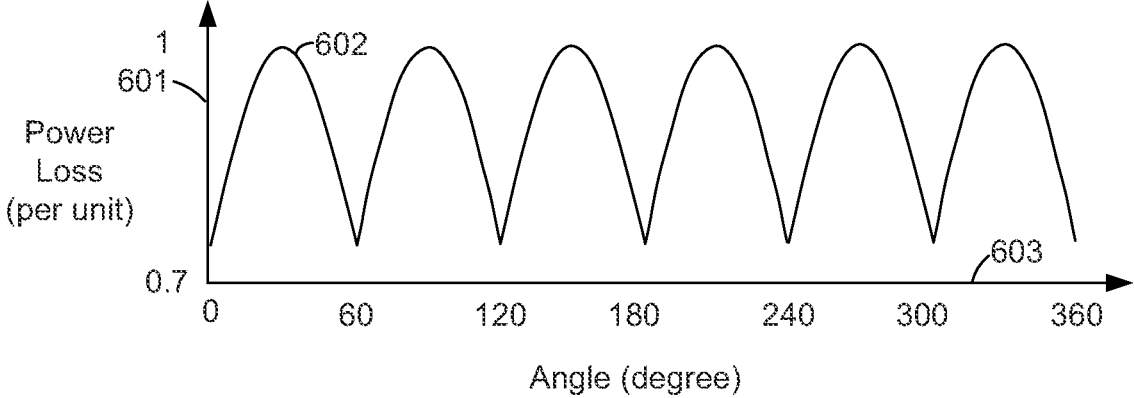

Referring now to FIG. 6, maximum conductive power losses for all current phases as a function of current angle for a three-phase electric machine operating at a constant torque output amount is shown. The vertical axis 601 represents power losses on a per unit or normalized basis and the amount of power losses increases in the direction of the vertical axis arrow. The horizontal 603 axis represents electric current angle and the electric current angles are indicated below the horizontal axis.

Trace 602 represents the maximum conductive power losses for all current phases of the electric machine. It may be observed that the maximum conductive power losses may be minimized when the electric machine electrical angle is at 0 degrees, 60 degrees, 120 degrees, 180 degrees, 240 degrees, 300 degrees, and 360 degrees. By positioning the rotor at zero, 60, 120, 180, 240, or 300 degrees, electric machine losses may be minimized so that electric machine torque output may be maximized. Consequently, if the electric machine rotor stops at 140 electrical degrees, the electric machine rotor may be rotated backward 20 electrical degrees to optimize electric machine output torque. On the other hand, if the electric machine rotor stops at 170 electrical degrees, the rotor may be rotated 10 electrical degrees in a forward direction to maximize the electric machine torque and power output such that the rotor stops at 180 electrical degrees where maximum electric machine power output may be maximized.

Figure 7:
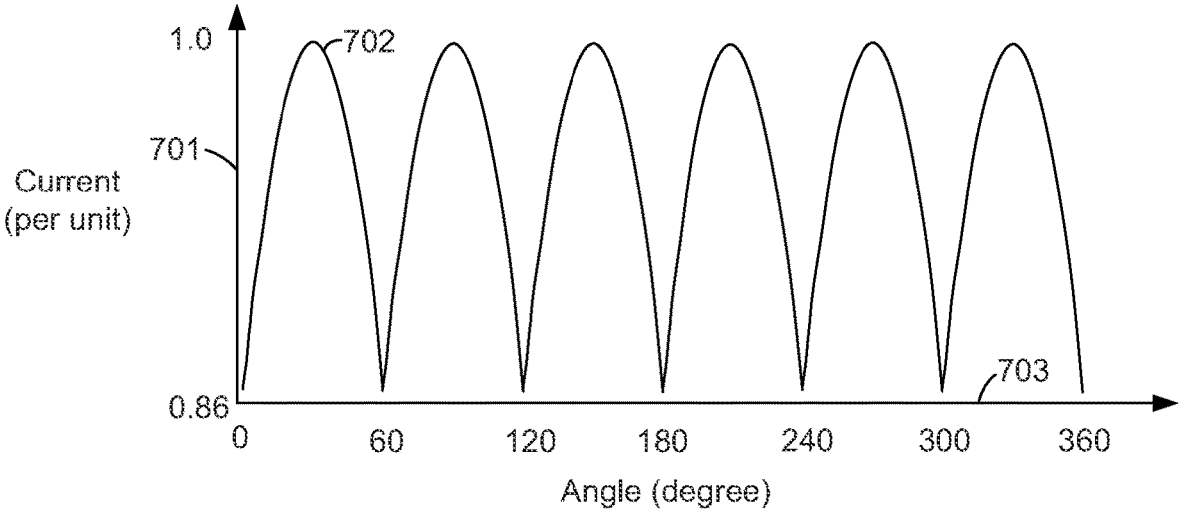

Referring now to FIG. 7, maximum electric current amounts among all phase currents of a three-phase electric machine operating at a constant torque output are shown. The vertical axis 701 represents electric currents amounts among all phases of a three-phase electric machine on a per unit or normalized basis and the amount of electric current increases in the direction of the vertical axis arrow. The horizontal axis 703 represents electric current angle and the electric current angles are indicated below the horizontal axis.

Trace 702 represents the maximum electric current level amounts among all phase currents of a three-phase electric machine operating at a constant torque. It may be observed that the maximum electric currents occur at 30 degrees, 90 degrees, 150 degrees, 210 degrees, 270 degrees, and 330 degrees. The minimum current levels for operating the electric machine with a constant torque output occur at 0 degrees, 60 degrees, 120 degrees, 180 degrees, 240 degrees, 300 degrees, and 360 degrees. Thus, the electric current may be minimized by positioning the rotor at 0, 60, 120, 180, 240, or 300 electrical degrees when electric machine speed is zero.

Figure 8:
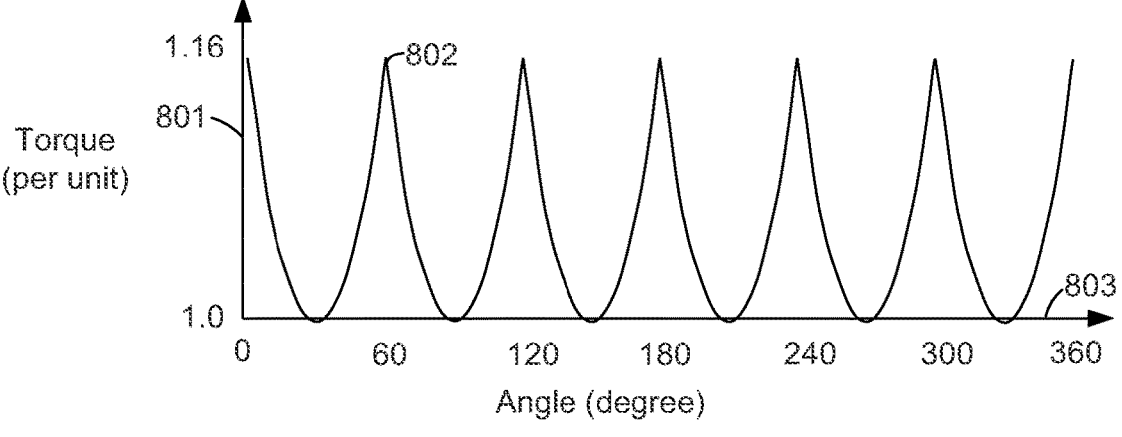

Referring now to FIG. 8, peak or maximum torque output of an electric machine operating at constant peak current as a function of current angle for a three-phase electric machine is shown. The vertical axis 801 represents peak electric machine torque output when operating the electric machine at constant peak current. The horizontal axis 803 represents electric current angle and the electric current angles are indicated below the horizontal axis.

Trace 802 represents the maximum or peak torque at constant peak electric current. It may be observed that the maximum or peak torque output of the electric machine occurs at electrical angles θ degrees, 60 degrees, 120 degrees, 180 degrees, 240 degrees, 300 degrees, and 360 degrees. By positioning the rotor at 0, 60, 120, 180, 240, or 300 electrical degrees, electric machine torque output may be maximized at zero electric machine rotational speed. Consequently, if the electric machine rotor stops at 140 electrical degrees, the electric machine rotor may be rotated backward 20 electrical degrees to optimize electric machine output torque. On the other hand, if the electric machine rotor stops at 170 electrical degrees, the rotor may be rotated 10 electrical degrees in a forward direction to maximize the electric machine torque and power output such that the rotor stops at 180 electrical degrees where maximum electric machine power output may be maximized.

It may be appreciated that FIGS. 3-8 show operating conditions that may be a basis for adjusting a position where a rotor of a propulsion source three phase electric machine is stopped (e.g., not rotating). Operating conditions for adjusting rotor position of a six-phase electric machine may also be a basis for adjusting rotor position of an electric machine. Plots and data for six phase electric machines may be determined in a similar way as was used to generate the plots and data for FIGS. 3-8.

Referring now to FIG. 9, a flow chart of a method for operating vehicle that includes an electric machine is shown. The method of FIG. 9 may be applied in cooperation with the system of FIG. 1. One or more controllers may perform at least a portion of method 900 via changing operating states of one or more actuators in the real world. The method 900 may be at least partially implemented as executable instructions stored in non-transitory memory of a controller in a system such as that shown in FIG. 1.

At 902, method 900 judges whether or not vehicle speed (VS) is within a threshold speed of zero. In one example, the threshold speed may be 3 kilometers/hour. If method 900 judges that vehicle speed is within a threshold speed of zero, the answer is yes and method 900 proceeds to 904. Otherwise, the answer is no and method 900 proceeds to 950.

At 950, method 900 adjusts electric machine torque output as a function of requested driver demand torque and requested braking torque. Requested driver demand torque may be based on a position of a driver demand pedal and requested braking torque may be based on a position of a brake pedal. Thus, if a position of the driver demand pedal indicates a request for 100 Newton-meters of torque output from the electric machine 105, the electric machine 105 is commanded to output 100 Newton-meters of torque. Method 900 proceeds to exit.

At 904, method 900 estimates a road grade or grade of a surface that the vehicle is traveling upon. In one example, the road grade or surface grade may be estimated via an inclinometer. In other examples, method 900 may determine a vehicle performance metric according to mass of the vehicle including mass of load applied to the vehicle and road or surface grade. In one example, the performance metric may be a rate of vehicle speed change for a given driver demand torque or power. Method 900 proceeds to 906 after the road or surface grade is determined and/or vehicle performance metric is determined.

At 906, method 900 judges whether or not road or surface grade may be overcome while the vehicle speed is zero and the electric machine rotor is not positioned for the electric machine to generate its maximum torque at zero electric machine speed. In other words, method 900 judges whether or not the vehicle and its total mass (e.g., mass of the vehicle plus mass of load added to the vehicle) may proceed in a forward direction from zero speed to a predetermined speed (e.g., 3 kilometers/hour) solely under electric machine power without heading in a reverse direction when the vehicle is engaged in first gear while traveling on a road or surface with the determined grade when the electric machines rotor is not positioned for the electric machine to generate maximum torque at zero electric machine speed. If so, the answer is yes and method 900 proceeds to 952. Otherwise, the answer is no and method 900 proceeds to 908. Step 906 permits adjustment of the electric machine rotor to be avoided when vehicle performance on a grade may be met. Further, step 906 prevents adjustment of electric machine rotor position when vehicle launch metrics may be met when the electric machine rotor is not positioned for maximum torque output when electric machine rotor speed is zero.

In some embodiments, method 900 may adjust an angular position of the electric machine rotor in response to the rotor not rotating and an anticipated rate of vehicle speed change during vehicle launch from zero speed to a predetermined speed being less than a launch metric of the vehicle. The launch metric may be a rate of vehicle speed change from zero vehicle speed to a predetermined vehicle speed. A simplified anticipated rate of vehicle speed change may be based on the stopping position of the rotor (to estimate electric machine torque at zero vehicle speed as determined from a look-up table housing predetermined torque values), vehicle mass, and gear ratio between the electric machine and vehicle wheels (vehicle speed change=force applied to wheels/mass of vehicle, where force applied to wheels is electric machine torque at zero speed multiplied by the gear ratio between the electric machine and the wheels divided by the wheel radius).

At 952, method 900 adjusts electric machine torque according to a creep torque demand and a driver demand torque. The creep torque demand may be a constant torque that may cause the vehicle to travel at a low speed (e.g., less than 5 kilometers/hour) when the vehicle is on a flat surface shortly after the vehicle was stopped and its brake pedal released without providing a driver demand torque. The creep torque may be sufficient to hold vehicle speed at or above zero for roads with low grade levels. Method 900 also adjusts electric machine torque according to a requested driver demand torque. For example, if driver demand torque is adjusted from 0 to 40 Newton-meters, the electric machine output torque may be adjusted from 0 to 40 Newton-meters. In other examples, the driver demand may be a requested wheel torque and electric machine torque may be adjusted to a torque that generates the requested wheel torque. Method 900 returns to 902.

At 908, method 900 judges whether or not vehicle speed is zero. If so, the answer is yes and method 900 proceeds to 910. Otherwise, the answer is no and method 900 proceeds to 952. The vehicle's tires, drivetrain, and gear lash may influence where the electric machine's rotor comes to rest. The electric machine's rotor position when the electric machine speed is zero, may influence the amount of torque that may be generated via the electric machine at zero speed.

At 910, method 900 applies vehicle brakes to hold the vehicle at zero speed. Method 900 proceeds to 912.

At 912, method 900 retrieves one or more target electric machine rotor positions from memory (e.g., read-only-memory). The one or more target electric machine rotor positions may be determined via modeling or commanding maximum electric machine torque at every one rotor degree increments while monitoring electric machine torque while electric machine speed is held at zero. The rotor positions may be rotor positions where maximum output torque is generated by the electric machine or rotor positions where losses of the electric machine are a minimum as shown in FIGS. 6 and 8. As shown in FIGS. 6 and 8, the rotor positions may be 0 degrees, 60 degrees, 120 degrees, 180 degrees, 240 degrees, and 300 degrees for a three phase electric machine. Other rotor positions for six phase electric machines may be generated in a similar way. Method 900 proceeds to 914.

At 914, method 900 opens a clutch in the vehicle's driveline to decouple the electric machine from the vehicle's wheels. By decoupling the electric machine from the vehicle's wheels, it may be possible to rotate the electric machine rotor to a position where maximum torque output of the electric machine may be generated at zero electric machine speed without moving the vehicle. In some examples, the clutch may be a dog clutch with teeth while in other examples the clutch may be a wet friction clutch or other known clutch type. The clutch type may influence what rotor positions are available to increase electric machine torque output at zero electric machine speed. For instance, with a dog clutch with teeth, the number of dog teeth and their angular orientation become part of the equation when considering what rotor positions 912 are available to increase electric machine torque output at zero electric machine speed. In one instance the rotor positions 912 are computed using the motor orientation and the last angular orientation of the dog teeth while in a brake locked 910, power path fixed, vehicle at zero speed condition. In another example, the motor will have an encoder (e.g., 168 of FIG. 1), and thus the motor angular orientation is known and the first clutch tooth 1002 angular orientation (e.g., as shown at FIG. 10) can be oriented and calibrated to the motor encoder, an encoder (e.g., 169 of FIG. 1) calibrated to the second clutch tooth 1004 angular orientation may be added to the second clutch power path side to know the mating tooth orientation. The use of one or both encoders may be used with or without the brake locked 910 for computing the rotor positions 912 that are available to increase electric machine torque output at zero electric machine speed, for instance if the vehicle were to roll. In cases where the clutch design may constrain electric machine rotor position due to teeth interference, the rotor may be rotated to a position that is closest to one of the rotor positions that were retrieved from memory. The motor may need to rotate more and skip over some clutch teeth to arrive at the best clutch tooth motor angle to increase electric machine torque output at zero electric machine speed. Method 900 may rotate the rotor to one of the exact rotor positions retrieved from memory when the clutch type does not interfere with rotor position adjustment.

At 916, method 900 rotates the electric machine's rotor to a position that is closest to one of the positions that were retrieved from controller memory at step 912 subject to teeth of a dog clutch, if present. When the vehicle includes a dog clutch, the clutch teeth on the electric machine side of the dog clutch are to be aligned for immediate tooth engagement with teeth on the clutch side opposite the electric machine side without tooth butting, rotation, or skipping so that the electric machine does not move from nearest its optimal position due to tooth engagement. For example, if an electric machine rotor stops at 100 degrees and the nearest location that the electric machine rotor may be stopped to be positioned for maximum torque output (e.g., 300 degrees) while engaging dog clutch teeth is 298 degrees, the electric machine rotor is rotated to 298 degrees. For friction clutches, the electric machine rotor may be adjusted to the position that was retrieved from controller memory (e.g., 180 degrees, 240 degrees, 300 degrees, etc.). The electric machine rotor may be rotated clockwise or counter clockwise to adjust the rotor position to the nearest rotor position that was retrieved from memory. Method 900 proceeds to 918 after the position of the electric machine rotor is adjusted.

At 918, method 900 closes the driveline clutch so that the electric machine is once again coupled to the vehicle's wheels after position of the electric machine rotor is adjusted to maximize electric machine torque output at zero speed. Method 900 proceeds to 920.

At 920, method 900 adjusts electric machine torque and braking torque according to a creep torque demand, a requested driver demand torque, and a requested braking torque. The creep torque demand may be a constant torque that may cause the vehicle to travel at a low speed (e.g., less than 5 kilometers/hour) when the vehicle is on a flat surface shortly after the vehicle was stopped and its brake pedal released without providing a driver demand torque. The creep torque may be sufficient to hold vehicle speed at or above zero for roads with low grade levels. Method 900 also adjusts electric machine torque according to a requested driver demand torque and adjusts friction braking torque according to the requested braking torque. For example, if requested braking torque is 50 Newton-meters and requested driver demand torque is 40 Newton-meters, vehicle friction brakes may be adjusted to provide the requested braking torque and the electric machine output torque may be adjusted to equal the requested driver demand torque. In other examples, the requested driver demand may be a requested wheel torque and electric machine torque may be adjusted to a torque that generates the requested wheel torque. Method 900 proceeds to exit.

In this way, a position of an electric machine rotor may be rotated to optimize torque output of the electric machine when torque output of the electric machine varies with angular position of the electric machine rotor at zero speed of the electric machine. The position of the electric machine rotor may be adjusted to where output torque of the electric machine is a maximum available torque of the electric machine when the electric machine speed is zero.

Thus, the method of FIG. 9 provides for a method for operating a vehicle, comprising: rotating an electric machine to a predetermined position in response to the vehicle being stopped on a first surface having a first grade greater than a threshold grade. In a first example, the method further comprises not rotating the electric machine to the predetermined position in response to the vehicle being stopped on a second surface having a second grade less than the threshold grade. In a second example that may include the first example, the method includes where the predetermined position is a position within a predetermined range of angular rotor positions of the electric machine where torque output of the electric machine is a maximum torque output of the electric machine at zero speed of the electric machine. In a third example that may include one or both of the first and second examples, the method includes wherein the electric machine is a synchronous machine or an induction machine. In a fourth example that may include one or more of the first through third examples, the method includes wherein the predetermined position is stored in memory of a controller, and wherein a first encoder and a second encoder provide data to rotate the electric machine to the predetermined position. In a fifth example that may include one or more of the first through fourth examples, the method includes wherein the predetermined position is a function of an angle of electric current supplied to the electric machine. In a sixth example that may include one or more of the first through fifth examples, the method includes wherein the first grade is estimated via an inclinometer. In a seventh example that may include one or more of the first through sixth examples, the method further comprises adjusting torque output of the electric machine in response to a creep torque request, driver demand torque request, and braking torque request after rotating the electric machine to the predetermined position.

Additionally, the method of FIG. 9 may provide for a method for operating a vehicle, comprising: applying vehicle brakes, opening a driveline clutch, and rotating an electric machine to a predetermined position in response to the vehicle being stopped. In a first example, the method includes wherein the predetermined position is a nearest angular position of a rotor of the electric machine relative to the position of the electric machine when the vehicle is initially stopped to where power losses of the electric machine are minimized. In a second example that may include the first example, the method includes wherein the predetermined position is a nearest angular position of a rotor of the electric machine relative to the position of the electric machine when the vehicle is initially stopped to where torque output of the electric machine is maximized. In a fourth example that may include one or more of the first through third examples, the method includes where the clutch is a dog clutch that includes teeth, and wherein the predetermined position is within a predetermined range of angular tooth positions of the dog clutch where torque output of the electric machine is equal to a maximum output torque of the electric machine at zero speed of the electric machine. In a fifth example that may include one or more of the first through fourth examples, the method includes where the clutch is a friction clutch.

In another representation, the method of FIG. 9 may provide for a method for operating a vehicle, comprising: adjusting an angular position of a rotor of an electric machine in response to the rotor not rotating and an anticipated rate of vehicle speed change from zero vehicle speed to a predetermined vehicle speed being less than a launch metric of a vehicle. In a first example, the launch metric may be a rate of vehicle speed change from zero vehicle speed to a predetermined vehicle speed (e.g., five kilometers/hour).

Referring now to FIG. 10, a perspective view of two halves of clutch 145 is shown. In this example, clutch 145 is a dog clutch that includes teeth 1002 on a first side of clutch 145 that interface with teeth 1004 of a second side of clutch 145.

Referring now to FIG. 11, a perspective view of clutch 145. In this example, clutch 145 is a wet friction clutch. Clutch 145 includes friction pads 1102 for transferring torque across clutch 145.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:

determining whether a road surface grade may be overcome while a speed of the vehicle is zero and a rotor of an electric machine of the vehicle is not positioned for the electric machine to generate its maximum torque at zero speed, and in response to determining that the road surface grade may not be overcome, opening a dog clutch, wherein the dog clutch includes teeth, and rotating the rotor to a predetermined angular position that increases torque output of the electric machine at zero speed, wherein the predetermined position is based on an angular orientation of the teeth of the dog clutch.

2. The method of claim 1, further comprising not rotating the rotor of the electric machine to the predetermined angular position in response to determining that the road surface grade may be overcome.

3. The method of claim 1, wherein the predetermined angular position that increases torque output of the electric machine at zero speed is one of 0 degrees, 60 degrees, 120 degrees, 180 degrees, 240 degrees, and 300 degrees.

4. The method of claim 1, wherein the electric machine is a synchronous machine or an induction machine.

5. The method of claim 1, wherein the predetermined angular position is stored in memory of a controller, and wherein a first encoder and a second encoder provide data to rotate the electric machine to the predetermined position.

6. The method of claim 5, wherein the predetermined angular position is a function of an angle of electric current supplied to the electric machine.

7. The method of claim 1, wherein the first-road surface grade is estimated via an inclinometer.

8. The method of claim 1, further comprising adjusting torque output of the electric machine in response to a creep torque request, driver demand torque request, and braking torque request after rotating the electric machine to the predetermined position.

9. A vehicle system, comprising:

an electric machine configured to propel a vehicle;

a driveline clutch;

an inverter electrically coupled to the electric machine; and a controller including executable instructions stored in non-transitory memory that cause the controller to:

retrieve one or more predetermined rotational positions from the non-transitory memory, wherein the predetermined rotational positions comprise rotor positions where maximum output torque is output by the electric machine; and in response to a surface grade where the vehicle is stopped or a launch metric of the vehicle when the vehicle is stopped, rotate a rotor of the electric machine to a predetermined rotational position of the one or more predetermined rotational rotor positions retrieved from memory, wherein the launch metric is a rate of vehicle speed change from zero to a predetermined vehicle speed.

10. The vehicle system of claim 9, further comprising additional executable instructions that cause the controller to adjust the rotational position of the rotor to a rotational position of the rotor of the electric machine where power losses of the electric machine are minimized at zero speed of the electric machine.

11. The vehicle system of claim 9, wherein the surface grade where the vehicle is stopped is greater than a threshold grade.

12. The vehicle system of claim 9, further comprising additional executable instructions that cause the controller to apply vehicle brakes in response to the vehicle being stopped.

13. The vehicle system of claim 12, further comprising additional executable instructions that cause the controller to open a clutch in response to the vehicle being stopped and the surface grade being greater than a threshold amount prior to adjusting the rotational position of the rotor where the vehicle is stopped.

14. The vehicle system of claim 13, wherein the driveline clutch is a dog clutch.

15. The vehicle system of claim 13, wherein the driveline clutch is a friction clutch.

16. A method for operating a vehicle, comprising:

retrieving one or more target positions from a controller memory, wherein the one or more target positions comprise rotor positions where maximum output torque is output by the electric machine, applying vehicle brakes to hold the vehicle at zero speed, opening a dog clutch, wherein the dog clutch includes teeth, and rotating an electric machine to a predetermined position in response to determining that the electric machine outputs less than an amount of torque to overcome a road surface grade the vehicle is on while the vehicle speed is zero and that the electric machine is not positioned for the electric machine to generate its maximum torque at zero speed, wherein the predetermined position is closest in angular displacement to one of the one or more target positions retrieved from controller memory subject to a number of the teeth of the dog clutch and an angular orientation of the teeth of the dog clutch.

17. The method of claim 16, wherein the predetermined position is a target angular position of a rotor of the electric machine that is closest in angular displacement to an angular position of the rotor when the vehicle is initially stopped, where power losses of the electric machine are minimized at the target angular position.

18. The method of claim 16, wherein the predetermined position is a target angular position of a rotor of the electric machine that is closest in angular displacement to an angular position of the electric machine when the vehicle is initially stopped, where torque output of the electric machine is maximized at the target angular position.

19. The method of claim 16, where the dog clutch includes teeth on an electric machine side and teeth on an opposite side, and wherein the predetermined position allows the teeth on the electric machine side to align with the teeth on the opposite side for immediate engagement.

* * * * *